US011680875B2

(12) United States Patent
Temiz et al.

(10) Patent No.: US 11,680,875 B2
(45) Date of Patent: Jun. 20, 2023

(54) MICROFLUIDIC DEVICES WITH CAPILLARY DILUTORS

(71) Applicant: INTERNATIONAL BUSINESS MACHINES CORPORATION, Armonk, NY (US)

(72) Inventors: Yuksel Temiz, Zug (CH); Emmanuel Delamarche, Thalwil (CH); Marco Rocca, Zurich (CH); Thomas Gervais, Montreal (CA)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 17/123,209

(22) Filed: Dec. 16, 2020

(65) Prior Publication Data

US 2022/0187174 A1    Jun. 16, 2022

(51) Int. Cl.
*G01N 1/38*    (2006.01)
*B01L 3/00*    (2006.01)
(Continued)

(52) U.S. Cl.
CPC .............. *G01N 1/38* (2013.01); *B01F 23/451* (2022.01); *B01F 23/453* (2022.01);
(Continued)

(58) Field of Classification Search
CPC ......... B01L 2400/0406; B01L 3/50273; B01L 2200/10; B01L 2300/0636;
(Continued)

(56) References Cited

U.S. PATENT DOCUMENTS 6,743,399 B1    6/2004  Weigl
2014/0370581 A1    12/2014  Saltsman
(Continued)

FOREIGN PATENT DOCUMENTS

WO    2019043106 A1    3/2019

OTHER PUBLICATIONS

Elveflow, Microfluidic mixers : a short review, Why do we need mixing in microfluidics? [accessed on Nov. 16, 2020]. 5 pages, Retrieved from the Internet: <URL: https://www.elveflow.com/microfluidic-reviews/microfluidic-flow-control/microfluidic-mixers-a-short-review/.
(Continued)

*Primary Examiner* — Jennifer Wecker
*Assistant Examiner* — Francis Paul Horvath
(74) *Attorney, Agent, or Firm* — Robert R. Aragona

(57) ABSTRACT

An embodiment for a microfluidic device is provided. The device comprises two areas, arranged side-by-side, and a trigger channel. They include a first area, which is delimited by a first liquid pinning barrier, and a second area, which is delimited by a second liquid pinning barrier. The latter extends parallel to the first liquid pinning barrier to delimit a corridor. The trigger channel extends through the corridor between the two areas. In addition, the trigger channel connects the first liquid pinning barrier with the second liquid pinning barrier, allowing a first liquid pinned at the first liquid pinning barrier and a second liquid pinned at the second liquid pinning barrier to be contacted, each, by a reverse flow of the second liquid in the trigger channel and thereby start mixing at a level of the corridor, in operation. The invention is further directed to related methods of operation.

20 Claims, 6 Drawing Sheets

(51) Int. Cl.
  *B01F 23/451*    (2022.01)
  *B01F 23/45*     (2022.01)
  *B01F 33/301*    (2022.01)
  *B01F 23/40*     (2022.01)
  *B01F 101/23*    (2022.01)

(52) U.S. Cl.
  CPC .... *B01F 33/3017* (2022.01); *B01L 3/502746* (2013.01); *B01L 3/502753* (2013.01); *B01F 23/483* (2022.01); *B01F 2101/23* (2022.01); *B01L 2200/10* (2013.01); *B01L 2300/165* (2013.01); *B01L 2400/0406* (2013.01); *B01L 2400/086* (2013.01); *B01L 2400/088* (2013.01); *G01N 2001/383* (2013.01)

(58) Field of Classification Search
  CPC ....... B01L 2300/0867; B01L 2400/043; B01L 2400/0481
  See application file for complete search history.

(56) References Cited

U.S. PATENT DOCUMENTS

2015/0040999 A1*   2/2015   Vulto ................ B01L 3/502738
                                137/516.11
2018/0345288 A1   12/2018   Belotserkovsky

OTHER PUBLICATIONS

Chen et al., A microfluidic nanoliter mixer with optimized grooved structures driven by capillary pumping, Journal of Micromechanics and Microengineering, 16 (2006), doi:10.1088/0960-1317/16/7/033, pp. 1358-1365.

Hong et al., A novel in-plane passive microfluidic mixer with modified Tesla structures, The Royal Society of Chemistry 2004, Lab Chip, 2004, 4, DOI: 10.1039/b305892a, pp. 109-113.

Ju et al., "Passive micromixer using by convection and surface tension effects with air-liquid interface," National nstitute of Health, Dec. 1, 2013; 7(4), pp. 361-366. doi:10.1007/s13206-013-7407-1.

Kuo et al., "Design optimization of capillary-driven micromixer with square-wave microchannel for blood plasma mixing," Microsyst Technol (2017) 23: 721-730, DOI 10.1007/s00542-015-2722-1.

Lee et al., "Vacuum pouch microfluidic system and its application for thin-film micromixerst," Royal Society of Chemistry, Lab Chip, Jul. 18, 2019, 19, pp. 2834-2843.

Taher et al., "A valveless capillary mixing system using a novel approach for passive flow control," Microfluid Nanofluid (2017) 21:143, DOI 10.1007/s10404-017-1981-9, 10 pages.

Tani et al., "Towards combinatorial mixing devices without any pumps by open-capillary channels: fundamentals and applications," Scientific Reports, Published Jun. 23, 2015, 5:10263 DOI: 10.1038/srep10263, 14 pages.

Vasilakis et al., "Novel modular pressure and flow rate balanced microfluidic serial dilution networks on printed circuit boards: Designs, Simulations and Fabrication," bioRxiv preprint, Feb. 23, 2018, doi: https://doi.org/10.1101/270124, 17 pages.

Ward et al., "Mixing in microfluidic devices and enhancement methods," 2015, J. Micromech. Microeng. 25 094001, 56 pages.

Suh et al., "A Review on Mixing in Microfluidics," Micromachines 2010, 1, 82-111; doi:10.3390/mi1030082, Published Sep. 30, 2010, 30 pages.

Nguyen et al., "Micromixers—A review," Journal of Micromechanics and Microengineering, vol. 15, No. 2, Dec. 8, 2004, 4 pages.

* cited by examiner

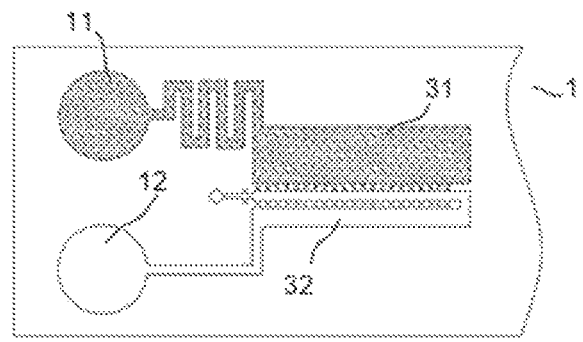
FIG. 2A
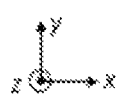
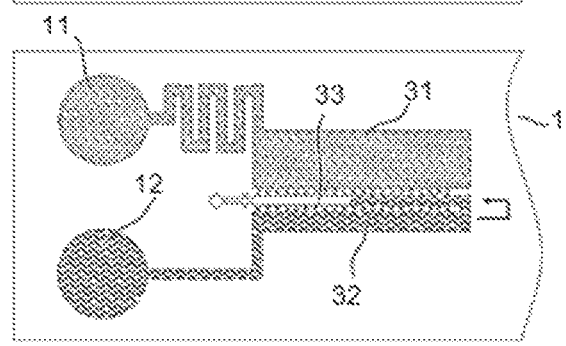
FIG. 2B
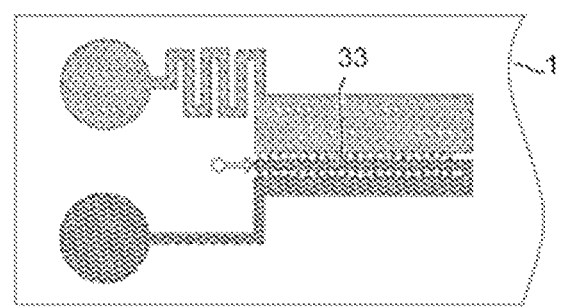
FIG. 2C
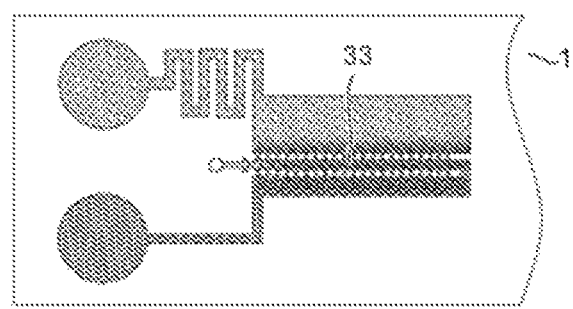
FIG. 2D

MICROFLUIDIC DEVICES WITH CAPILLARY DILUTORS

GOVERNMENT LICENSE RIGHTS

The project leading to this application has received funding from the European Union's Horizon 2020 research and innovation program under grant agreement 764476.

BACKGROUND

The invention relates in general to the field of microfluidics. In particular, it concerns microfluidic devices comprising a capillary dilutor formed by opposite liquid pinning barriers.

Microfluidics deals with the precise control and manipulation of small volumes of fluids. Typically, such volumes are in the sub-milliliter range and are constrained to micrometer-length scale channels. Prominent features of microfluidics originate from the peculiar behavior that liquids exhibit at the micrometer length scale. Flow of liquids in microfluidics is typically laminar. Volumes well below one nanoliter can be reached by fabricating structures with lateral dimensions in the micrometer range. Microfluidic devices generally refer to microfabricated devices, which are used for pumping, sampling, mixing, analyzing and dosing liquids.

Many microfluidic devices have user chip interfaces and closed flow paths. Closed flow paths facilitate the integration of functional elements (e.g., heaters, mixers, pumps, UV detector, valves, etc.) into one device while minimizing problems related to leaks and evaporation. The analysis of liquid samples often requires a series of steps (e.g. filtration, dissolution of reagents, dilution of liquids, heating, washing, reading of signal, etc.). For portable diagnostic devices, this may require accurate flow control using various pumping and valve principles.

Microfluidics has opened the door for applications in many areas of healthcare and life sciences, such as point-of-care diagnostics (POCDs), environmental analysis, and drug discovery. POCDs strongly benefit from microfluidic technologies due to the miniaturization of tests, which enhances portability and the integration of various functions into one diagnostic device. For instance, many lateral flow assay tests rely on microfluidic functions and microfabrication to increase their precision and multiplexing capabilities.

However, in many assays performed at the point of care, there is a need to perform two assays from a same sample, where one of the assays needs to be performed using a diluted sample. Now, performing a dilution off chip requires additional steps, which result in biohazards, potential imprecision, and errors.

SUMMARY

According to a first aspect, the present invention is embodied as a microfluidic device. The device basically comprises two areas and a trigger channel. The two areas are arranged side-by-side. They include a first area, which is delimited by a first liquid pinning barrier. The two areas further include a second area, which is delimited by a second liquid pinning barrier. The latter extends parallel to the first liquid pinning barrier, whereby the first liquid pinning barrier and the second liquid pinning barrier delimit a corridor between the two areas. The trigger channel branches from the second area. It extends through said corridor between the two areas. The trigger channel is typically connected to a vent. In addition, the trigger channel connects the first liquid pinning barrier with the second liquid pinning barrier, so as to allow a first liquid pinned at the first liquid pinning barrier and a second liquid pinned at the second liquid pinning barrier to be contacted, each, by a reverse flow of the second liquid in the trigger channel and thereby start mixing at a level of the corridor, in operation.

The trigger channel and the second pinning barrier prevent the second liquid to directly meet the first liquid pinned at the first pinning barrier. In absence of the second barrier, the two liquids would meet at the first barrier, which would cause to drag one of the liquids into the opposite area, and thus impair the dilution, as the present inventors observed. On the contrary, the proposed design allows a clean dilution to occur from the trigger channel. In particular, the trigger channel and the second barrier prevent a diluent introduced in the first area to directly flow from the first area to the second area. On the contrary, the liquid sample introduced in the second area can merge with the diluent during the reverse flow of the second liquid, as occurring through the trigger channel. The relative dimensions of the two areas determine the dilution factor.

Advantageously, the present devices can be embodied as capillary-driven microfluidic chips, thereby allowing volumetric mixing to be achieved between two liquids with a viscosity-independent, passive dilutor. That is, such devices preferably comprise one or more capillary pumps connected to one or each of the two areas or forming part thereof.

The liquid pinning barriers can be obtained in different ways. In embodiments, the first liquid pinning barrier and the second liquid pinning barrier are configured as one of: two opposite sets of pinning structures, opposite pinning rails, opposite hydrophobic patches, or a pinning trench. Preferably though, the first liquid pinning barrier and the second liquid pinning barrier include respective sets of liquid pinning structures, the latter separated by gaps, in each of the sets. Liquid pinning structures make it possible to obtain a very stable liquid pinning and can easily be processed as they require only one mask for fabrication.

The dimensions of the gaps can be optimized to ensure both a stable liquid pinning and a satisfactory release of the pinned liquids. In preferred embodiments, an average width of said gaps is between 3 and 200 μm. Lengths of the gaps are measured along a direction parallel to a longitudinal direction of extension of the corridor.

Preferably, the gaps of the first liquid pinning barrier are shifted with respect to the gaps of the second liquid pinning barrier. This minimizes the risk of (or even prevents) liquid bulges that form at the pinning structures coalescing with opposite liquid bulges, in operation. This way, the two liquids remain neatly pinned at their respective pinning barriers until they are contacted, each, by the reverse flow.

In embodiments, the pinning structures have, each, in-plane cross-sections that are shaped as triangles, wherein straight sides of the triangles are aligned with longitudinal directions of extension of the minimal gaps. I.e., such straight sides of the triangles delimit the corridor. The vertices that are opposite to said straight sides point inwards of respective ones of the two areas. A triangular shape makes it possible to increase the angle between the surface of the pinning structure and the liquid meniscus, which improves the stability of the pinning.

Preferably, an average pitch between said vertices is between 20 and 100 μm. The pitches between said vertices are measured along said direction parallel to the longitudinal direction of extension of the corridor. Such pitches result in a sufficient number of apertures, so as to achieve a sufficient liquid mixing in practice.

In preferred embodiments, the average length of the minimal gaps is between 3 and 45 μm. The gaps of each of the sets of the liquid pinning structures are measured along a direction coinciding with a respective one of the longitudinal edges of the corridor.

Preferably, the corridor and the two areas are defined in a same plane of the device, while the liquid pinning structures protrude, each, from said same plane, and an average height of the liquid pinning structures is between 5 and 100 μm. More preferably, the average height of the liquid pinning structures is between 10 and 20 μm and an average aspect ratio between the average length of the minimal gaps and said average height is between 1:5 and 3:1. That is, the minimal gaps between the pinning structures and the average height of the pinning structures can be jointly optimized, to improve the pinning properties of the liquid pinning barriers.

In embodiments, an average width of the corridor is between 5 and 100 μm, wherein the width of the corridor is measured perpendicularly to a longitudinal direction of extension of the corridor.

In preferred embodiments, the two areas and the corridor form a meandering pattern of interdigitated meanders. The interdigitated structure provides a larger diluted sample volume without increasing the mixing time.

The device preferably comprises two liquid loading pads connected to respective ones of the two areas, upstream of the two areas, e.g., via respective connection channels. The device may further comprise a detection area that is in fluidic communication with the second area, downstream of the second area. A trigger mechanism may advantageously be relied upon to trigger the filling of the detection area.

Preferably, said two areas and said corridor form part of a first unit of the device and the device comprises multiple such units, where the units are fluidly connected in series, to increase the dilution.

In preferred embodiments, said two areas are defined in a cavity in the device. The surfaces of the two areas may substantially differ, such that the two areas may store substantially different volumes of liquids therein, which impacts the dilution factor.

Preferably, the first area is fully delimited, on one side thereof, by the first liquid pinning barrier, whereas the second area is only partly delimited, on one side thereof, by the second liquid pinning barrier, whereby a passage is formed at an end of the second liquid pinning barrier; the trigger channel branches from the second area at the level of this passage.

According to another aspect, the invention is embodied as a method of mixing liquids. The method first comprises providing a microfluidic device such as described above, i.e., including two areas arranged side-by-side, and a trigger channel. According to this method, a first liquid is introduced into the first area for the first liquid to get pinned at the first liquid pinning barrier. After that, or concomitantly, a second liquid is introduced into the second area for the second liquid to get pinned at the second liquid pinning barrier and then fill the trigger channel. This, in turn, allows the first liquid (still pinned at the first liquid pinning barrier) and the second liquid pinned at the second liquid pinning barrier to be contacted, each, by a reverse flow of the second liquid in the trigger channel and thereby start mixing at the level of the corridor.

In preferred embodiments, if the first liquid has a larger viscosity than the second liquid introduced, then the first liquid is introduced prior to introducing the second liquid. Otherwise, the second liquid is introduced prior to introducing the first liquid. I.e., if two liquids have substantially different viscosities, it is preferred to introduce the high-viscosity liquid first.

Devices and methods embodying the present invention will now be described, by way of non-limiting examples, and in reference to the accompanying drawings.

BRIEF DESCRIPTION OF SEVERAL VIEWS OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which:

FIGS. 1 and 2-6 are top views of microfluidic devices according to various embodiments of the invention;

FIG. 2 is a sequence illustrating high-level steps of operating the device of FIG. 1, as in embodiments;

Figure 1:
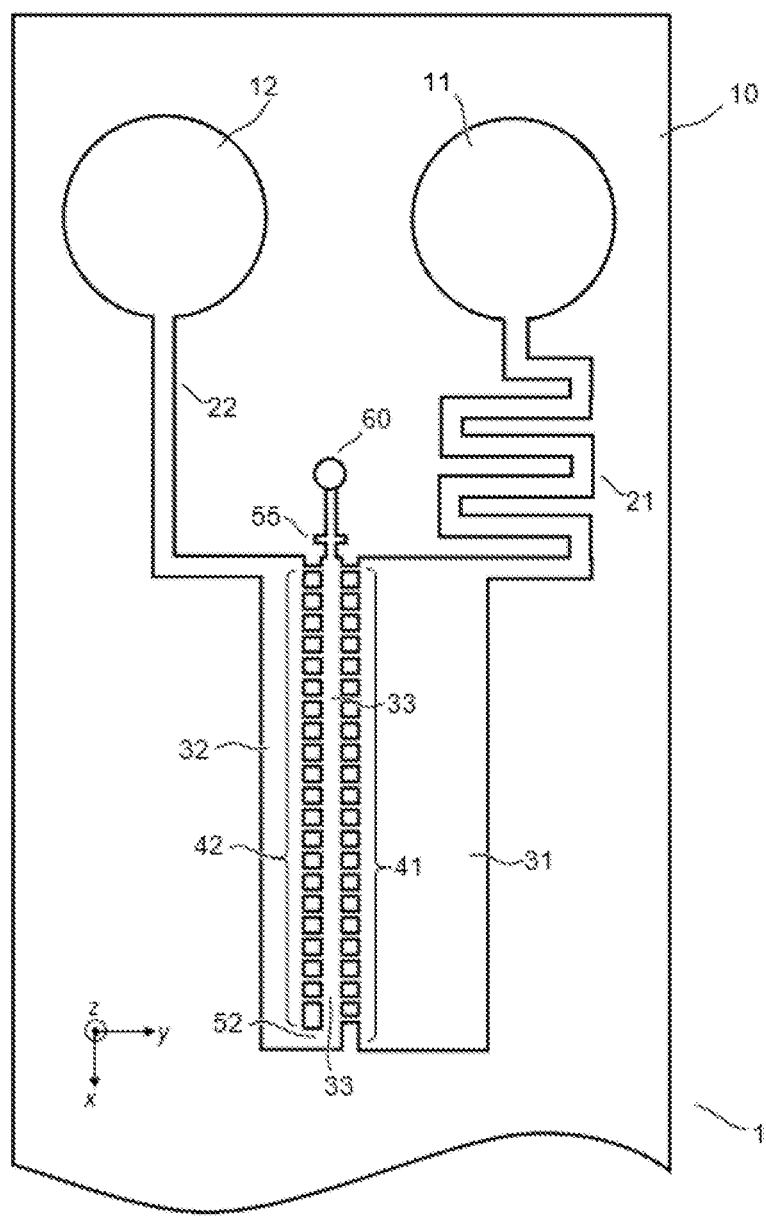

The accompanying drawings show simplified representations of devices or parts thereof, as involved in embodiments. Technical features depicted in the drawings are not necessarily to scale. Similar or functionally similar elements in the figures have been allocated the same numeral references, unless otherwise indicated.

DETAILED DESCRIPTION OF EMBODIMENTS OF THE INVENTION

Following the concern noted in the background section, the present inventors concluded that a microfluidic device may ideally integrate a dilution function in a simple manner, so as to make up a simple-to-use device, preferably without incurring additional fabrication costs due to complex fabrication steps. More preferably, the resulting device should be a passive device, operable in a power-free manner.

However, implementing an efficient dilutor on a microfluidic device is not easy, as the present inventors observed. One may notably contemplate diluting a liquid directly in the liquid loading reservoir. However, doing so may be prone to pipetting errors and require additional valving and mixing strategies. It is typically difficult to pipette less than 10 μL of liquid. For a 1:10 dilution, for example, 90 μL of diluent needs to be pipetted, which requires a fairly large reservoir. More important, the first liquid should be prevented to flow until the second liquid is applied. An efficient mixing may further require active agitation in the reservoir.

Next, mixing (or diluting) two liquids based on the ratio of their upstream hydraulic resistances is not a viable option because the flow rate also depends on the viscosity, which may vary substantially for biological liquid samples (e.g., blood, human serum). Such an implementation may also result in a strong back-flow when the two liquids merge at a junction, as the present inventors observed during experiments with blood.

A precise volumetric dilution can potentially be achieved by merging two liquids inside an area that is geometrically well-defined. To that aim, one may for instance contemplate using a "capillary pinning line", to hold the first liquid at the level of a line where two liquids later merge, as the present inventors tested. However, during the filling of the second liquid, the first liquid is also carried along, which prevents the formation of a continuous interface between the two liquids. Thus, no volumetric dilution can be simply achieved in that case, as the inventors verified experimentally.

With the above issues in mind, the present inventors came to develop a novel and simple microfluidic device design, in which two opposite liquid pinning barriers are used to contain the liquids and trigger dilution, as discussed below in detail.

In reference to FIGS. 1, and 3 to 6, a first aspect of the invention is now described, which concerns a microfluidic device 1, 1a-1d.

The device notably includes two areas 31, 32, which are arranged side-by-side. In detail, a first area 31 is delimited by a first liquid pinning barrier 41, while a second area 32 is delimited by a second liquid pinning barrier 42. The liquid pinning barriers 41, 42 typically bound the areas 31, 32 on one side thereof, laterally. In that sense, the areas 31, 32 are only partly delimited by the liquid pinning barriers (hereafter mostly referred to as "barriers", for simplicity). The areas 31, 32 can otherwise be defined in one or more cavities, i.e., as depressions formed in the thickness of a layer 10 of the device, as in preferred embodiments. Such cavities can thus be adequately delimited, laterally.

The second barrier 42 extends parallel to the first liquid pinning barrier 41. As a result, the first barrier 41 and the second barrier 42 delimit a corridor 33 between the two areas 31, 32. In fact, the parallel barriers 41, 42 delimit the three areas 31, 33, and 32. I.e., the corridor 33 extends between the two barriers 41, 42, whereas the first area 31 and the second area 32 extend on outer sides of their respective barriers 41, 42. Owing to the above geometry, the corridor 33 extends between the first area 31 and the second area 32, along and between each of the liquid pinning barriers.

The device further includes a trigger channel 33, which extends through the corridor 33 between the two areas 31, 32. Note, the trigger channel may actually correspond to the corridor, as in the example FIG. 1. For this reason, the trigger channel and the corridor are identified by a same numeral reference 33 in the accompanying drawings. The trigger channel 33 further branches from the second area 32, so as to allow a reverse flow of liquid to form in the trigger channel 33, in operation, for reasons explained below.

The trigger channel connects the first barrier 41 with the second barrier 42. This, in operation, allows a first liquid L1 pinned at the first barrier and a second liquid L2 pinned at the second barrier to be contacted, each, by a reverse flow of the second liquid L2 in the trigger channel 33. Once the reverse flow of liquid L2 wets the barriers 41, 42 and thus contacts the liquids L1, L2 pinned at their respective barriers 41, 42, the pinned liquids L1, L2 start mixing (i.e., merging) at the level of the corridor 33. Then, the mixing spreads into each of the areas 31, 32 by diffusion, see FIG. 2D. The trigger channel 33 connects the first barrier 41 with the second barrier 42, in the sense that the trigger channel 33 allows initially pinned liquids to start mixing in the corridor 33 once contacted by the reverse flow. I.e., the reverse flow causes to connect the oppositely pinned liquids.

The function of the liquid pinning barriers is to initially keep the two liquids L1, L2 well separated from each other and confined in their respective areas 31, 32 before a contact between the two liquid interfaces is triggered by the reverse flow of the second liquid L2 as the latter fills the trigger channel 33. Thus, the trigger channel 33 can be regarded as both a return channel and a release channel. The arrangement of the trigger channel allows a liquid that has already filled the second area 32 to fill the trigger channel 33 and thereby wet the barriers 41, 42 to trigger the mixing. As the present inventors realize, this principle can be exploited to controllably mix the liquids L1, L2 or, equivalently, dilute one L2 of the liquids into the other liquid L1.

This principle is now described in detail in reference to another aspect of the invention, which concerns a method of mixing liquids. This method relies on a microfluidic device as described above, i.e., including two areas 31, 32 arranged side-by-side, with a trigger channel 33 extending in-between. As illustrated in FIG. 2A, a first liquid L1 is introduced into the first area 31, e.g., via a first loading pad 11, so as for the first liquid L1 to get pinned at the first liquid pinning barrier 41. After that, or concomitantly, a second liquid L2 is introduced into the second area 32, e.g., via a second loading pad 12, so as for the second liquid L2 to get pinned at the second liquid pinning barrier 42, see FIG. 2B.

The liquid having the largest viscosity is preferably introduced first (in the area 31), to allow the liquid with smaller viscosity to timely fill the corridor 33. This has multiple advantages. First, this reduces the filling time of the corridor 33 and hence the delay time for liquid L1 and liquid L2 to come in contact. This is notably beneficial for those applications where the contact between the two liquids L1, L2 triggers a chemical/biochemical reaction. A fast filling time of the corridor 33 results in reaction kinetics that are more homogeneous across the whole areas of the chip. Second, this allows a minimal flow from the larger viscosity liquid (in area 31) into the corridor 33, as the lower viscosity liquid (in area 32) fills the corridor 33, hence resulting in a more precise mixing/dilution ratio.

Because the trigger channel 33 branches from the second area 32, liquid L2 in the second area 32 starts filling the trigger channel 33, thereby causing a reverse flow in the channel 33, see FIGS. 2B and 2C. As the liquid L2 fills the channel 33, it comes to contact each of the liquids L1, L2, still pinned at their respective barriers 41, 42, such that the hitherto pinned liquids L1, L2 start mixing at the level of the corridor 33, as depicted in FIG. 2D. The liquids L1, L2 mix by passive diffusion in a volume defined by the two areas 31, 32. The ratio between the volumes of liquids L1, L2 stored in the respective areas 31, 32 defines the dilution ratio of the liquids L1, L2.

The trigger channel 33 and the second pinning barrier 42 prevent the second liquid L2 to directly meet the first liquid L1 at the first pinning barrier 41. In absence of the second barrier 42, the two liquids L1, L2 would meet at the first barrier 41, which would cause to drag one of the liquids L1 into the opposite area, and thus impair the dilution, as noted earlier. On the contrary, the proposed design and method allow a clean dilution to occur from the trigger channel 33. In particular, the trigger channel 33 and the second barrier 42 prevent a diluent introduced in the first area 31 to directly flow from the first area 31 to the second area 32. As a result, the liquid sample L2 introduced in the second area 32 can neatly merge with the diluent during the reverse flow through the trigger channel 33. The relative dimensions of the two areas 31, 32 determine the dilution factor.

The above aspects of the present invention are now described in detail, in reference to particular embodiments of the invention. To start with, the liquid pinning barriers 41, 42 can be obtained in different ways. The liquid pinning barriers 41, 42 may notably be configured as opposite sets of pinning structures, opposite pinning rails, opposite hydrophobic patches, or a pinning trench. In detail, each liquid pinning barrier 41, 42 may notably include a set of pinning structures 415, as seen in FIGS. 7A, 7D, 8, and 9. Alternatively, they may be formed as pinning rails 41a, 42a, see FIGS. 7B and 7E. In variants, the liquid pinning barriers 41, 42 are formed as a pinning trench 33b, as depicted in FIGS. 7C and 7F. In that case, the barriers 41, 42 correspond to opposite, upper edges of the trench 33b. In other variants, the barriers 41, 42 may be obtained as hydrophobic patches, the latter forming a pattern similar to FIG. 7B when viewed from the top. In each case, the barriers 41, 42 form elongated objects or structures separate (at least partly) the corridor 33 from the areas 31, 32.

Preferred, however, is to rely on liquid pinning barriers 41, 42 formed as opposite sets of liquid pinning structures 415, wherein the structures 415 are separated by gaps, in each set, as depicted in FIGS. 7A, 7D, 8 and 9. Liquid pinning structures 415 can easily be processed as they require only one mask for fabrication. Moreover, they make it possible to obtain a stable liquid pinning. In comparison, a pinning rail 41a requires two layers of patterning by way of etching, additive patterning, or a combination thereof. Plus, the stability of the liquid pinning might be challenged at the edges (channel inlet or outlet) where the rail 41a connects to a channel wall. A pinning trench 33b has similar drawbacks. The rails 41a, 42a can potentially be replaced by hydrophobic layers to confine the liquids L1, L2. However, hydrophobic layers will typically be more difficult to fabricate than liquid pinning structures 415.

Figure 8:
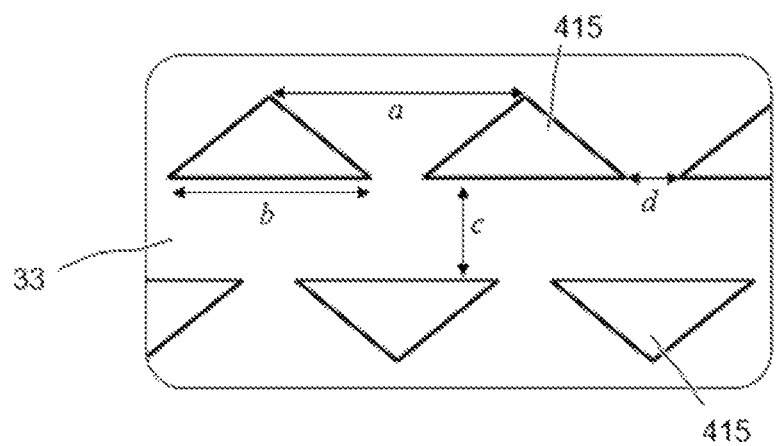
FIG. 8 essentially corresponds to FIG. 7A and additionally identifies dimensions of the pinning structures, the gaps, and the trigger channel.

Referring to FIGS. 1 and 8, the pinning structures 415 may have various in-plane shapes, e.g., rectangular, triangular, rounded, etc. In embodiments, the average length of the minimal gaps d between the pinning structures 415 is between 3 and 200 μm, preferably between 3 and 45 μm, and more preferably between 5 and 30 μm, e.g., between 10 and 20 μm. Such gaps correspond to minimal distances between consecutive structures 415, as measured along a direction parallel to the longitudinal direction of extension of the corridor 33, i.e., parallel to direction x in the accompanying drawings. Note, while this direction is assumed to be straight (at least locally), the corridor 33 does, as a whole, not necessarily need to be straight, as discussed latter in reference to FIGS. 4 and 5. In all cases, the direction of extension of the corridor 33 is parallel to the direction of extension of the liquid pinning barriers 41, 42. In embodiments, the length of the liquid pinning barriers 41, 42 is between 100 μm and 100 mm, preferably between 1 mm and 30 mm.

Figure 7A:
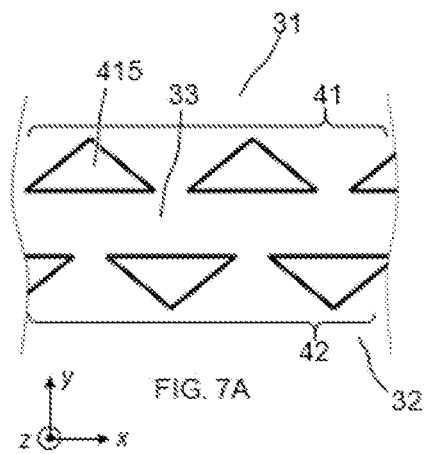
FIGS. 7A-7C are top views of devices according to distinct embodiments, showing of local portions about the liquid pinning barriers. I.e., the liquid pinning barriers may notably be formed as opposite sets of pinning structures separated by gaps (FIG. 7A), pinning rails (FIG. 7B), or as a pinning trench (FIG. 7C).
Figure 7D:
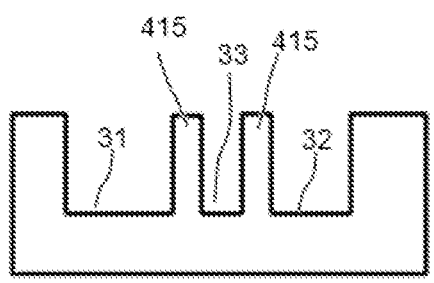
FIGS. 7D-7F show corresponding cross-sections.
Figure 7B:
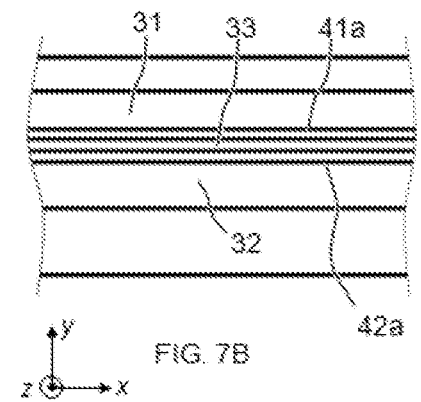
Figure 7E:
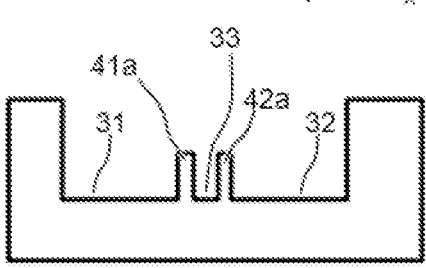
Figure 7C:
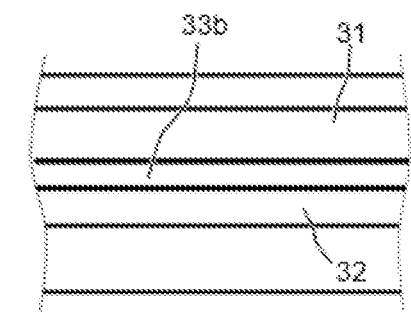
Figure 7F:
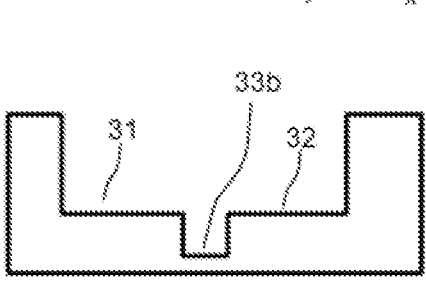
Figure 9:
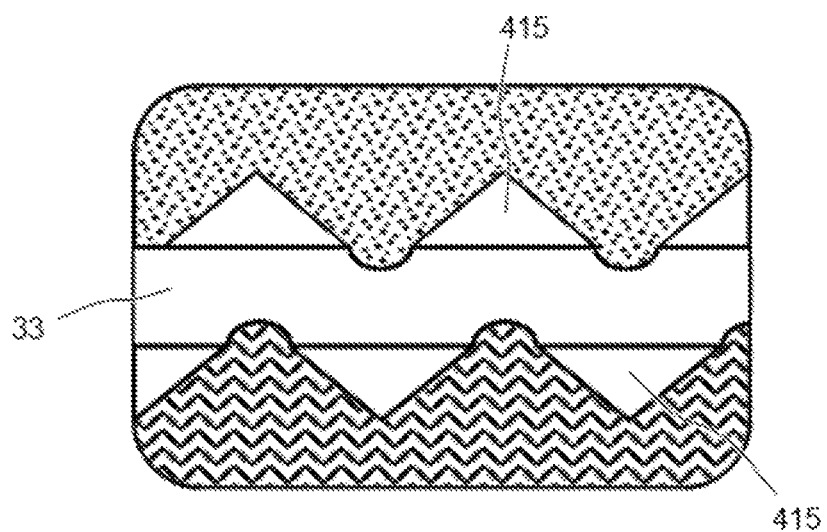
FIG. 9 illustrates how shifted pinning structures and gaps (as in FIG. 8) prevent liquid bulges of oppositely pinned liquids to coalesce, in operation.

As further seen in FIGS. 7A, 8, and 9, the opposite pinning structures 415 are preferably shifted, such that the gaps d in the first barrier 41 are shifted with respect to the gaps in the second barrier 42. Thus, the opposite gaps are not in vis-à-vis. This minimizes the risk of (or even prevents) liquid bulges that form at the pinning structures 415, in operation, coalescing with opposite liquid bulges, as illustrated in FIG. 9. I.e., the pinned liquids L1, L2 will accordingly not mix before the returning flow wets the pinning structures 415 of the two barriers 41, 42.

As depicted in FIGS. 7A, 8, and 9, each pinning structure 415 preferably has an in-plane cross-section that is shaped as a triangle. The triangles are oriented so as for straight sides thereof to be aligned with longitudinal directions of extension of the minimal gaps d. I.e., such straight sides border the corridor 33 and delimit it. The opposite vertices of the triangles (i.e., opposite to said straight sides) point inwards of the respective areas 31, 32. A triangular shape makes it possible to increase the angle between the surface (after the pinning point) of a pinning structure 415 and the liquid meniscus, which improves the stability of the pinning.

In embodiments, the average pitch a between said opposite vertices is between 20 and 100 μm, and preferably between 40 and 60 μm, although larger pitches can be contemplated, e.g., between 5 and 200 μm. The pitches a are measured along a direction parallel to the longitudinal direction x of extension of the corridor 33. Such pitches should ideally be chosen so as to maximize the number of apertures and thus speed up liquid mixing. Their dimensions, however, are limited by the lithography resolution at fabrication.

In preferred embodiments, each pinning structure 415 has a triangular, in-plane cross-section, as described above, and the average length of the minimal gaps d is between 3 and 45 μm. The lengths of the gaps (in each of the sets of the pinning structures 415) are measured along a direction coinciding with a respective longitudinal edge of the corridor 33, i.e., the direction passing through the straight sides (of the triangles) that border the corridor 33.

The average length b of the straight sides of the triangles, i.e., the length of the pinning structure 414 sides bordering the corridor 33, is preferably between 4 and 100 μm, and more preferably between 10 and 60 μm, e.g., between 30 and 40 μm. Such straight sides should ideally be as small as possible, although their minimal dimensions are, again, limited by the resolution of the lithographic process used at fabrication.

Note, the two areas 31, 32 and the corridor 33 are preferably formed as open cavities (having an essentially constant depth) on one side of a layer 10 of the device 1. The areas 31-33 may be formed in a single cavity. In that case, the corridor 33 and the two areas 31, 32 are defined in a same plane of the device 1 (i.e., a recessed plane corresponding to the lower wall of the cavity). Thus, the liquid pinning structures 415 protrude, each, from said same plane, as assumed in the accompanying drawings.

The average height of the liquid pinning structures 415 may for instance be between 5 and 100 μm. More preferably, the average height of the liquid pinning structures 415 is between 10 and 20 μm.

The minimal gaps between the pinning structures 415 and the average height of the pinning structures 415 can be jointly optimized. In particular, the average aspect ratio between the average length of the minimal gaps d and said average height is preferably between 1:5 and 3:1, especially where the average height of the liquid pinning structures 415 is between 10 and 20 μm, e.g., of 15 μm. Such aspect ratios give rise to a satisfactory liquid pinning, in practice.

In embodiments, the average width c of the corridor 33 is between 5 and 100 μm, although corridor widths of 1 to 1000 μm can be contemplated in practice. The width c of the corridor 33 is measured perpendicularly to the longitudinal direction x of extension of the corridor 33. Note, this width is more preferably between 10 and 20 μm. It is ideally as small as possible to reduce the error in the dilution factor. It is, however, limited by the maximal size of the liquid bulges that can be afforded at the level of the gaps d.

For example, the liquid pinning structures 415 can be obtained as 15 μm thick SU-8 structures on a silicon or glass substrate. In variants, the liquid pinning structures 415 are obtained as few μm deep trenches on a silicon substrate or as hydrophobic patches patterned using a hydrophobic, self-assembled layer on gold. Similar pinning structures 415 can further be obtained using molding, milling, or embossing polymers.

With minimal gaps of 10 to 20 μm between the structures 415 and a trigger channel width of 20 μm, the resulting liquid bulges at the gaps remain sufficiently small and thereby prevent the oppositely pinned liquids L1 and L2 to coalesce. Note, the trigger channel 33 should ideally be made as small as possible to reduce the error in the dilution ratio. The channel width of the areas 31 and 32 can be tuned to achieve the desired dilution ratio. E.g., with a channel width of 80 μm for the area 31, a channel width of 10 μm for area 32 and a trigger channel width of 10 μm, a dilution factor of 10 can possibly be achieved in one step.

The following table aggregates preferred ranges of values for the dimensions of the liquid pinning structures 415 and the corridor 33.

TABLE 1

Preferred ranges of values for the dimensions involved in FIG. 8

| Parameter | Range [μm] | Preferred range [μm] | Most preferred range [μm] |
| --- | --- | --- | --- |
| channel height | [1-1000] | [5-100] | [10-20] |
| a Pitch between pinning features | [5-200] | [20-100] | [40-60] |
| b Length of pinning structure side | [4-100] | [10-60] | [30-40] |
| c Width of trigger channel | [1-1000] | [5-100] | [10-20] |
| d Minimal gaps (width of the pinning valve) | [3-45] | [5-30] | [10-20] |

Figure 4:
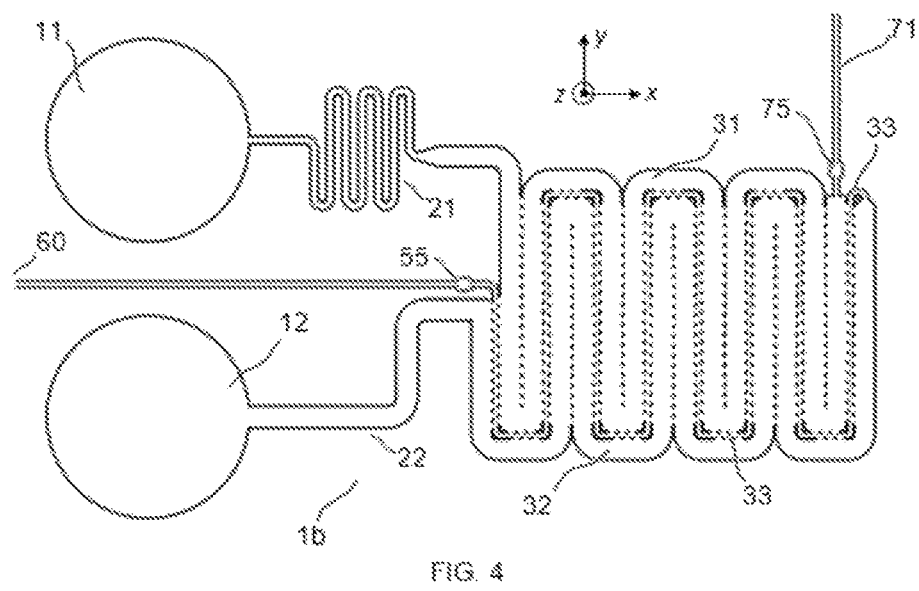
Figure 5:
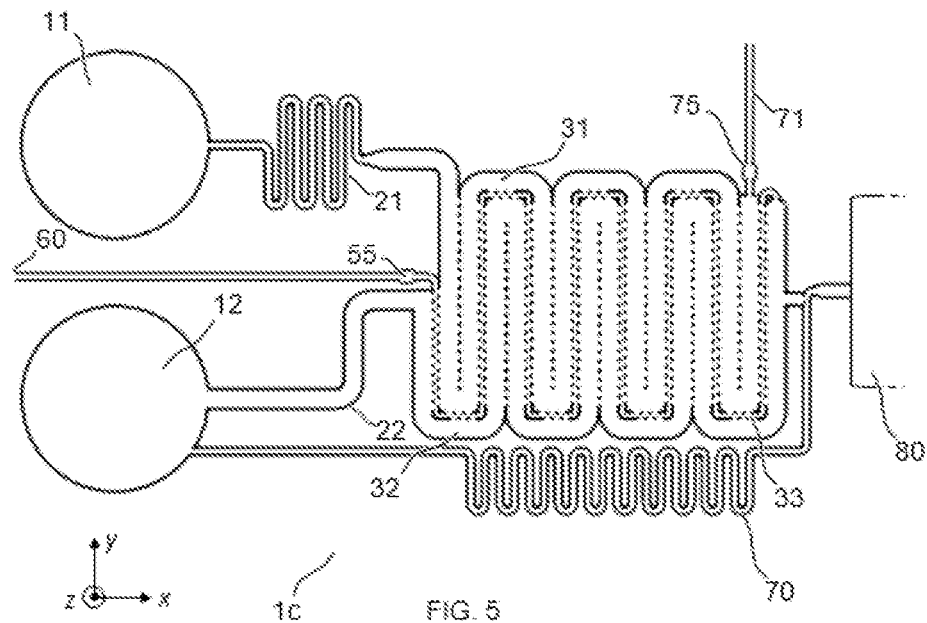

The devices 1, 1a-1d preferably comprise two loading pads (i.e., liquid loading areas) 11, 12. The two liquid loading pads 11, 12 are connected to respective areas 31, 32, upstream of the two areas. For example, the device, such as device 1a, may include a first loading pad 11 (e.g., for loading a diluent), where the first loading pad 11 is connected to the first area 31 via a first channel 21. The first channel 21 is preferably meandered, so as to provide sufficient resistance and restrict the flow of the diluent. Similarly, a second loading pad 12 may be provided (e.g., for loading a liquid sample), which is connected to the second area 32 via a second channel 22. The two areas 31, 32 may possibly be configured as channels 21, 22, as illustrated in FIGS. 4 and 5.

The present devices 1, 1a-1d may advantageously be embodied as capillary-driven microfluidic chips, thereby allowing volumetric mixing to be achieved between two liquids L1, L2, thanks to a viscosity-independent, passive dilutor. The order in which liquid L1 and liquid L2 are introduced in the dilutor is irrelevant to the working principle of the device 1a. However, introducing the most viscous liquid sample first reduces the delay time to bring the liquids L1, L2 into contact and has additional advantages in applications as discussed earlier. The present devices 1, 1a-1d preferably comprise one or more capillary pumps connected to (and/or forming part of) one or each of the two areas 31, 32. That is, such devices 1, 1a-1d are preferably configured as passive devices, wherein the liquids L1, L2 are capillary driven. To that aim, the flow paths 21, 22, 31, 32, 33 will typically be made wetting the liquids of interest, although some components (e.g., liquid pinning barriers 41, 42) may possibly be hydrophobic, as in embodiments evoked earlier. Such flow paths 21, 22, 31, 32, 33 may themselves play the role of capillary pumps, just like the detection chamber 80.

The flow path structures (e.g., areas 31, 32, loading pads 11, 12, microchannels 21, 22, detection chambers 80, etc.) are preferably formed as cavities (i.e., depressions) or grooves on a main surface of a layer of the device 1a. This layer is for example a substrate, or any layer that is sufficiently thick to provide mechanical stability to the device 1a, although mechanical stability may be provided by means of an additional, underlying layer. In all cases, the layer on which the flow path structures are patterned may typically be an essentially planar object, such as a chip, a wafer or any such planar support. This layer may include various structures formed thereon, in particular microstructures 21, 22, 55, 60, 70, 71, 75 and other microfluidic features, such as capillary pumps, loading pads 11, 12, anti-wetting structures, flow resistors, as well as electric circuits and contact pads, if necessary. The flow path structures are typically covered (sealed), e.g., by a light-permissive layer, for detection/monitoring purposes.

Preferably, a characteristic depth of the present flow path structure is in the micrometer-length range, i.e., between 1 μm and 1000 μm (and more preferably between 10 μm and 200 μm). Yet, some particular structures of the present devices 1, 1a-1d may be in the nanoscale range or in the millimeter range. As a whole, the present devices 1, 1a-1d are typically in the centimeter range. Widths (e.g., as measured in-plane) of the channels 21, 22, 70, 71 and vents 60 will typically be in the micrometer-length range too.

The average diameters of the areas 31, 32 (FIG. 1) and the detection chambers 80 (FIG. 5) are preferably between 50 μm and 500 μm and, more preferably, between 100 μm and 200 μm. The diameter of an area 31, 32 or a chamber 80 is measured in-plane (e.g., in plane with the upper surface of the layer on which channels are grooved, for example). Channel widths are measured in-plane too, perpendicularly to the direction of propagation of a liquid in the channels 21, 22, 70, 71, noting that this width will normally be substantially smaller than the average diameters of the areas 31, 32 and the detection chambers 80.

Figure 3:
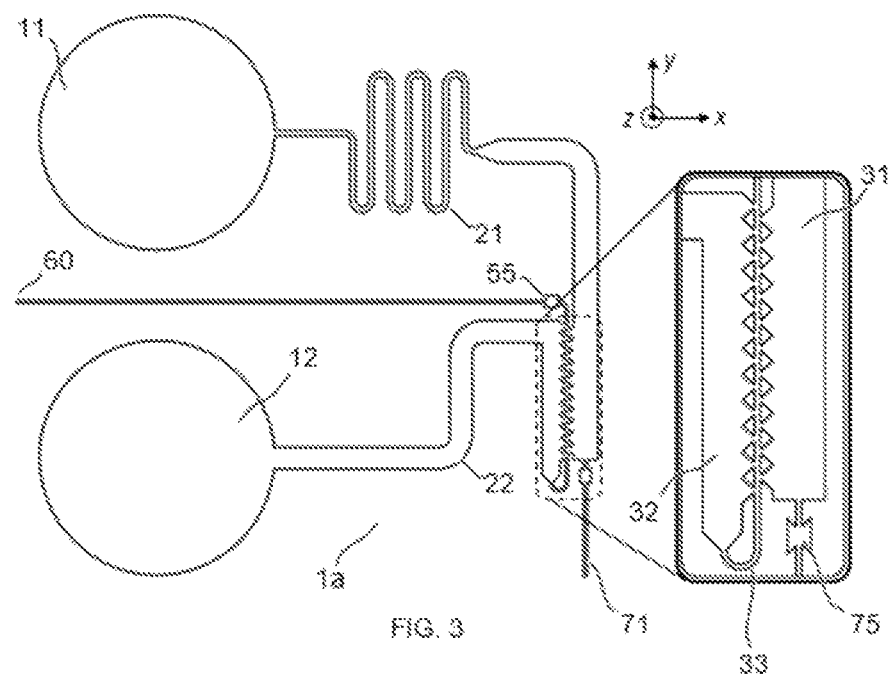

Notwithstanding, the areas 31, 32 may possibly be formed as channels 21, 22, 70, 71, as assumed in FIGS. 3-5. In particular, referring to the devices 1b and 1c of FIGS. 4 and 5, the two areas 31, 32 and the corridor 33 may form a meandering pattern of interdigitated meanders 31, 32. The interdigitated meanders 31, 32 are still separated by liquid pinning barriers 41, 42 (each comprising sets of pining structures 415), which delimit the trigger channel 33, the latter meandering between the areas 31, 32. Since the three regions 31-33 remain locally parallel, they can form a meandering pattern. This way, a basic unit module such as shown in FIGS. 4 and 5 can be scaled along the x and y direction to form an interdigitated structure, so as to form a compact arrangement. The interdigitated structure provides a larger diluted sample volume without increasing the mixing time.

As described above, the second area 32 is preferably connected to a detection area 80, see FIG. 5. That is, the detection chamber 80 is in fluidic communication with the second area 32, downstream of the latter. Indeed, for many applications, the diluted sample L1-L2 may advantageously be moved to another area for downstream detection. This may possibly require a triggering mechanism or an active valve. To that aim, an additional channel 70 may be provided, which connects the loading pad 12 to the detection chamber 80, as illustrated in FIG. 5. This additional channel 70 serves as a time-delayed trigger channel. The time-delayed trigger can be used to tune the incubation time in the dilutor module 31-33 and ensure sufficient mixing by passive diffusion. The hydraulic resistance of the additional channel 70 provides the required time delay. The additional channel 70 has a much higher resistance than the sample channel 32, to limit the flow of the non-diluted sample into the detection chamber 80.

In other embodiments, an active valve can be implemented using a mechanical actuation, an electrical pulse, or other optical, thermal, or magnetic actuation principles. However, active valves may typically require complicated fabrication techniques. If an external liquid pump (e.g., a syringe pump) is used instead of an integrated capillary pump, then the mixture (or diluted liquid sample) can be moved to another area by actively pumping the liquids. In this case, the flow rates of the liquids L1, L2 (or the pumping pressure) should be adjusted in a way that the pinning structures 415 can withstand the liquid pressure during the initial filling of the liquids L1, L2.

In FIG. 5, the liquid pinning structures 415 between the interdigitated meanders 31, 32 allow the diluted liquid to flow out orthogonally to the initial filling direction. This stretches the interface between the two liquids L1, L2 and hence decreases the diffusion time required for mixing. The desired dilution factor is achieved by tuning the volume ratio between the two channels 31, 32. The desired dilution can typically be achieved in 3 minutes or less, with a reasonable dilution inaccuracy (e.g., of 16% or less).

In other aspects of the present invention, meandering channels 31-33 separated by liquid pinning structures 415, i.e, the liquid pinning structures 415 between the interdigitated meanders 31, 32, can be substituted by a channel wall to allow a serpentine flow out of the diluted sample. A serpentine arrangement allows the whole volume of the dilutor to be available for further use, whereby a smaller area is eventually required. However, such an arrangement also results in longer times for the liquids L1, L2 to mix through passive diffusion. An interdigitated arrangement relying on additional liquid pinning structures 415 between the meander channels 31, 32 provides a more efficient mixing, which is enhanced during the out-flow of the liquid mixture by Taylor-Aris dispersion when the liquid L1 moves to the next area.

As previously described, the two areas 31, 32 are preferably defined in a single cavity in the device 1, 1a-1d such that the positions of the barriers 41, 42 and thus the surfaces defined by the two areas 31, 32 determine the volume of liquids L1, L2 that can fill the two areas 31, 32 before mixing. This cavity is laterally delimited and is typically open on top. However, the devices 1, 1a-1d may be sealed or covered, on top, by a lid or a layer (not shown), at a later stage of fabrication, e.g., by the end user her/himself.

In practice, the surfaces of the two areas 31, 32 may substantially differ. This way, the two areas 31, 32 will be able to store substantially different volumes of liquids L1, L2 therein, which, in turn, impacts the dilution factors eventually achieved. However, achieving a high dilution factor (e.g., larger than 1:10) can be difficult and long when using passive devices 1, 1a-1d such as shown in FIGS. 1-5.

Figure 6:
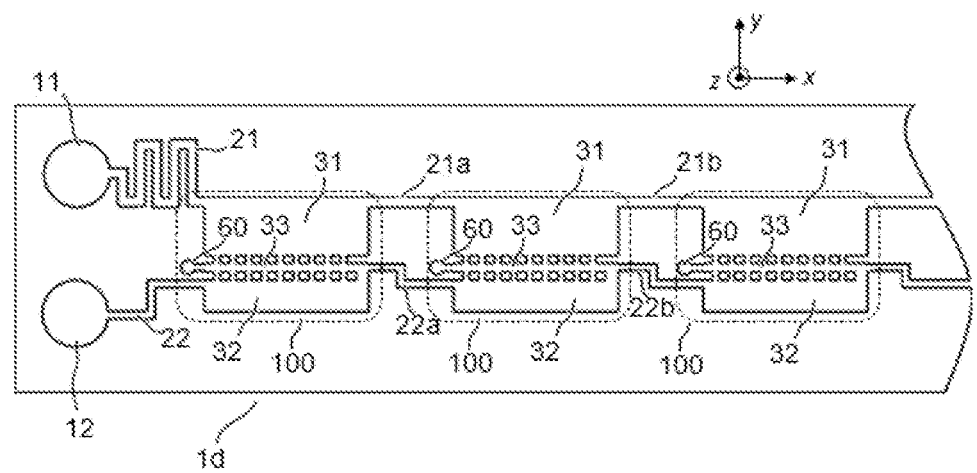

Therefore, in embodiments, the present microfluidic devices 1, 1a-1d comprise multiple units 100, which are connected in series, as depicted in FIG. 6. Still, each unit 100 comprises two areas 31, 32 and a corridor 33, as described earlier. Such units 100 can, nevertheless, be fluidly connected in series, e.g., via successive outlet channels 22a, 22b, etc., connecting an area 32 of an upstream unit 100 to the area 32 of a downstream unit 100, as seen in FIG. 6. For example, each corridor 33 can still be connected to a respective vent 60, while a series of connection channels 21a, 21b, etc., ensure fluidic communication between areas 31 of the units 100. This way, a first liquid L1 can be introduced via the first loading pad 11 to successively fill the area 31 of the successive units 100 and get pinned at the respective barriers 41, 42. A second liquid L2 can then be introduced via the second loading pad 12, to fill an area 32 of the first (upstream) unit 100. The reverse flow in the corridor 33 will trigger dilution in the first unit 100, before the second liquid L2 reaches the second unit 100, and so on. For instance, small dilutor units 100 (offering dilution ratios of, e.g., 1:2) can be connected in series to multiply the dilution factor at each stage (thereby passing to 1:4, then 1:8, and so on). The output of each stage 100 can also be used for detection purposes, to increase the dynamic range of an assay, for example. Note, each unit 100 may include meandering channels 31-33 (as in FIGS. 4 and 5) in lieu of rectangular areas (as in FIG. 1), to increase the volume of mixing liquids L1, L2.

In the embodiments of FIGS. 1 and 6, the first area 31 is fully delimited (i.e., bounded), on one side thereof, by a first liquid pinning barrier 41, whereas the second area 32 is only partly delimited, on one side thereof, by the second liquid pinning barrier 42. This way, a liquid passage 52 is formed at an end of the second liquid pinning barrier 42. This allows a simple and compact design to be achieved, in which the trigger channel 33 branches from the second area 32 at the level of this passage 52. In variants where the second area 32 is formed as a (meandering) channel, the trigger channel 33 branches from the very end of the second area 32, and loops back between the two areas 31, 32, as illustrated in FIGS. 3-5.

In all cases, the trigger channel 33 can be connected to a respective vent 60, via a valve 55. This way, air flushed by the second liquid L2 introduced in the second area 32 can be ejected via the vent 60. Similarly, the areas 31, 32 may be connected to a respective vent 60 via a dedicated channel 71, e.g., branching at the end of the first area 31, and a valve 75. The vents 60 are normally arranged downstream of their respective channel 33 or area 31, 32.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated. For example, other materials can be contemplated for the devices.

What is claimed is:

1. A microfluidic device comprising:
   two areas arranged side-by-side, including:
      a first area delimited by a first liquid pinning barrier, and
      a second area delimited by a second liquid pinning barrier that extends parallel to the first liquid pinning barrier, wherein the first liquid pinning barrier and the second liquid pinning barrier delimit a corridor between the two areas; and
   a trigger channel, which:
      branches from the second area,
      extends through the corridor between the two areas, and
      connects the first liquid pinning barrier with the second liquid pinning barrier, so as to allow a first liquid pinned at the first liquid pinning barrier and a second liquid pinned at the second liquid pinning barrier to be contacted, each, by a reverse flow of the second liquid in the trigger channel and thereby start mixing at a level of the corridor.

2. The microfluidic device according to claim 1, wherein the first liquid pinning barrier and the second liquid pinning barrier are configured as one of: two opposite sets of pinning structures, opposite pinning rails, opposite hydrophobic patches, or a pinning trench.

3. The microfluidic device according to claim 2, wherein the first liquid pinning barrier and the second liquid pinning barrier include respective sets of liquid pinning structures, the set of liquid pining structures of the second liquid pinning barrier separated by gaps, in each of the sets.

4. The microfluidic device according to claim 3, wherein an average width of said gaps is between 3 and 200 µm, and lengths of the gaps are measured along a direction parallel to a longitudinal direction of extension of the corridor.

5. The microfluidic device according to claim 3, wherein the gaps of the first liquid pinning barrier are shifted with respect to the gaps of the second liquid pinning barrier.

6. The microfluidic device according to claim 5, wherein the pinning structures have, each, in-plane cross-sections that are shaped as triangles, and straight sides of the triangles are aligned with longitudinal directions of extension of the minimal gaps, so as to delimit the corridor, wherein vertices opposite to the straight sides point inwards of respective ones of the two areas.

7. The microfluidic device according to claim 6, wherein an average pitch between said vertices is between 20 and 100 µm, and pitches between the vertices are measured along said direction parallel to the longitudinal direction of extension of the corridor.

8. The microfluidic device according to claim 6, wherein an average length of the minimal gaps is between 3 and 45 µm, the gaps of each of the sets of liquid pinning structures measured along a direction coinciding with a respective one of the longitudinal edges of the corridor.

9. The microfluidic device according to claim 8, wherein the corridor and the two areas are defined in a same plane of the device, the liquid pinning structures protrude, each, from the same plane, and an average height of the liquid pinning structures is between 5 and 100 µm.

10. The microfluidic device according to claim 9, wherein the average height of the liquid pinning structures is between 10 and 20 µm, and an average aspect ratio between the average length of the minimal gaps and the average height is between 1:5 and 3:1.

11. The microfluidic device according to claim 1, wherein an average width of the corridor is between 5 and 100 µm, the width of the corridor being measured perpendicularly to a longitudinal direction of extension of the corridor.

12. The microfluidic device according to claim 1, wherein the two areas and the corridor form a meandering pattern of interdigitated meanders.

13. The microfluidic device according to claim 1, wherein the device further comprises:
   two liquid loading pads connected to respective ones of the two areas, upstream of the two areas, and
   a detection area that is in fluidic communication with the second area, downstream of the second area.

14. The microfluidic device according to claim 1, wherein the device further comprises:
   one or more capillary pumps connected to one or more of the two areas.

15. The microfluidic device according to claim 1, wherein the two areas and the corridor form part of a first unit of the device, wherein the device comprises multiples units, each similar to the first unit, and the units are fluidly connected in series.

16. The microfluidic device according to claim 1, wherein the two areas are defined in a cavity in the device, and surfaces of the two areas substantially differ, such that the two areas store substantially different volumes of liquids therein.

17. The microfluidic device according to claim 1, wherein the first area is fully delimited, on one side thereof, by the first liquid pinning barrier, whereas the second area is only partly delimited, on one side thereof, by the second liquid pinning barrier, whereby a passage is formed at an end of the second liquid pinning barrier, and the trigger channel branches from the second area at a level of the passage.

18. The microfluidic device according to claim 1, wherein the trigger channel is connected to a vent.

19. A method of mixing liquids, the method comprising:
   providing a microfluidic device including:
      two areas arranged side-by-side, including a first area delimited by a first liquid pinning barrier, and a second area delimited by a second liquid pinning barrier that extends parallel to the first liquid pinning barrier, whereby the first liquid pinning barrier and the second liquid pinning barrier delimit a corridor between the two areas; and
      a trigger channel, wherein the trigger channel branches from the second area, extends through the corridor between the two areas, and connects the first liquid pinning barrier with the second liquid pinning barrier, and
   introducing:
      a first liquid into the first area for the first liquid to get pinned at the first liquid pinning barrier, and
      a second liquid into the second area for the second liquid to get pinned at the second liquid pinning barrier and then fill the trigger channel, so that the first liquid pinned at the first liquid pinning barrier and the second liquid pinned at the second liquid pinning barrier are contacted, each, by a reverse flow of the second liquid in the trigger channel, and thereby the first liquid and the second liquid start mixing at a level of the corridor.

20. The method according to claim 19, wherein if the first liquid has a larger viscosity than the second liquid introduced, then the first liquid is introduced prior to introducing the second liquid.

* * * * *